United States Patent
Hardison

(10) Patent No.: US 6,591,781 B2
(45) Date of Patent: Jul. 15, 2003

(54) SQUIRREL PROOF BIRD FEEDER

(75) Inventor: Stewart Hardison, Bainbridge, NY (US)

(73) Assignee: Perky-Pet Products Co., Denver, CO (US)

( * ) Notice: Subject to any disclaimer, the term of this patent is extended or adjusted under 35 U.S.C. 154(b) by 0 days.

(21) Appl. No.: 09/929,762

(22) Filed: Aug. 14, 2001

(65) Prior Publication Data

US 2003/0033985 A1 Feb. 20, 2003

(51) Int. Cl.$^7$ ............................................... A01K 61/02
(52) U.S. Cl. ..................................... 119/57.9; 119/52.3
(58) Field of Search ............................. 119/52.1, 52.2, 119/52.3, 57, 57.8, 57.9

(56) References Cited

U.S. PATENT DOCUMENTS

| | | | |
|---|---|---|---|
| 2,856,898 A | * 10/1958 | Doubleday et al. | ........ 119/57.9 |
| 2,891,508 A | * 6/1959 | Bower | ..................... 114/221 R |
| 3,117,554 A | * 1/1964 | Taylor | ........................ 119/52.3 |
| 3,124,103 A | * 3/1964 | Stainbrook | ................. 119/52.3 |
| 4,030,451 A | 6/1977 | Miller | |
| 4,031,856 A | 6/1977 | Chester | |
| 4,102,308 A | 7/1978 | Kilham | |
| 4,434,745 A | 3/1984 | Perkins | |
| 4,541,362 A | * 9/1985 | Dehls | ........................ 119/57.9 |
| 4,646,686 A | 3/1987 | Furlani | |
| 5,048,461 A | 9/1991 | Wessner | |
| 5,156,112 A | 10/1992 | Brown | |
| 5,163,382 A | 11/1992 | Morrison | |
| 5,195,459 A | 3/1993 | Ancketill | |
| 5,195,460 A | 3/1993 | Loken | |
| 5,207,181 A | 5/1993 | Loken | |
| 5,255,631 A | 10/1993 | Anderson | |
| 5,375,558 A | 12/1994 | Drakos | |
| 5,568,789 A | * 10/1996 | Koenig et al. | ............. 119/57.9 |
| 5,678,507 A | * 10/1997 | Kassner | ..................... 119/57.9 |
| 5,720,238 A | 2/1998 | Drakos | |
| 5,826,540 A | * 10/1998 | Bridges | ..................... 119/52.3 |
| 5,921,201 A | * 7/1999 | Green | ........................ 119/429 |
| 5,964,183 A | 10/1999 | Czipri | |
| 6,253,707 B1 | * 7/2001 | Cote | ........................ 119/57.9 |

* cited by examiner

*Primary Examiner*—Peter M. Poon
*Assistant Examiner*—Susan Piascik
(74) *Attorney, Agent, or Firm*—Richard Stephens

(57) ABSTRACT

A bird feeder which utilizes a shielding collar that behaves substantially like a universal-joint. The hollow, generally-cylindrical collar surrounds an annular food tray. The collar has a plurality of openings to provide access to the food tray, with a perch rod adjacent each opening. The collar is suspended by a spring device operative to allow the collar to simultaneously tilt, move downwardly and rotate, thus occluding the passage to food whenever the weight and agitated movements of a squirrel are brought to bear upon the collar.

12 Claims, 8 Drawing Sheets

SQUIRREL PROOF BIRD FEEDER

BACKGROUND OF THE INVENTION

1. Field of the Invention

My invention relates to bird feeders, and more particularly to improved feeders from which small animals such as squirrels and raccoons successfully steal or eat food. The use of bird feeders as lawn and garden implements has become a widespread hobby for a major part of the consumer public. While most persons who maintain bird feeders intend that only birds will feed from them, it is common for squirrels and raccoons to steal much of the food from such feeders, much to the displeasure of the people who have placed the feeders with intent to attract song birds.

2. Description of the Prior Art

There have been many attempts to provide bird feeders with means for preventing squirrels, large birds and the like from gaining access to feed within a feeder. A serious deficiency of many such feeders is believed to result from an insufficient appreciation of the extreme agility and perserverence of squirrels, and similar animals.

In a number of these feeders (U.S. Pat. Nos. 5,255,631; 5,207,181; 5,195,460; 5,048,461) a base member which supports a supply of food carries a spring means which supports a secondary masking, or shield member. The masking member is sufficiently above the food supply to allow birds access to the food. Being of relative light weight (1 to 2 ounces), the birds do not compress, or activate, the spring means. Squirrels or like-sized animals, however, have sufficient weight to compress the spring means, thereby lowering the masking member to where it occludes access to the food supply. This form of feeder has the general disadvantage of allowing feeding access from only one elevation, or from one side of a rectangular box like structure, which limits the number of birds which can feed at any one time. This characteristic also limits the viewing opportunity for owners, as the feeder has to be precisely aligned to the viewer for the viewer to see the feeding area, and thus the birds.

In other prior art feeders (U.S. Pat. Nos. 5,964,183; 5,720,238; 5,375,558; 5,195,459; 5,163,382; 5,156,112; 4,646,686), a metal or wire sleeve surrounds the sides of a tower. A spring means supports the sleeve relative to the tower at a position such that openings in the sleeve ordinarily register with feed holes in the sides of the tower. If a squirrel or other animal of like weight clings to the sleeve, its weight compresses the spring means, moving the openings in the sleeve downward so they no longer register with the holes in the tower, thus preventing the squirrel from reaching food. This type of feeder depends on the registration and de-registration of pairs of holes. This form of feeder suffers from the disadvantage that it is telescopic in its movements, which means the outer sleeve moves parallel to the inner tower. This telescopic movement tends to bind, or catch, somewhat more easily than is desired. When the mechanism binds, the outer sleeve does not fully drop, or slide all the way downward, which results in the feeding ports not being totally occluded, thus allowing the squirrel an opportunity to feed. Moreover, because of the critical tolerances of the inner and outer sleeves, this binding can occur once the outer sleeve has dropped fully, and has occluded the feeding ports. When binding occurs at this position, the outer sleeve does not spring upward upon departure of the squirrel, thus rendering the feeder useless to birds that subsequently visit to partake of food.

It is highly desirable that a bird feeder which prevents squirrels from feeding not be disabled from feeding birds if it has been activated to prevent a squirrel from feeding. It is also highly desirable that a bird feeder mechanism operative to prevent squirrel feeding not be damaged if the feeder is knocked or slammed by a larger animal such as a raccoon, and another object of the present invention is to provide such an improved bird feeder.

Still other prior feeders (U.S. Pat. Nos. 4,030,451; 4,031,856; 4,102,308) utilize an over-sized dome structure, or inverted dish, to shield a food tray from squirrels; or attempt to fence squirrels out by having a wire mesh surround the food delivery means (U.S. Pat. No. 4,434,745). These feeders have the disadvantage of excluding certain types of desirable birds; and, because of their utilitarian armaments, these types of feeders are deemed aesthetically undesirable by a large segment of the public.

SUMMARY OF THE INVENTION

One general object of the invention is to provide a bird feeder which is attractive to many birds, but which does not often lose its contents to a very diligent and extremely agile squirrel. One of the primary attending objects of the present invention is to provide a bird feeder which will more effectively prevent squirrels and raccoons from feeding from the feeder. Another more specific object of the present invention is to provide a bird feeder wherein the forces which a squirrel or like animal imparts to the operative food-denying mechanism of the feeder operate in complex manners, through plural or even infinite degrees of mechanical freedom, so that a squirrel or like animal cannot learn how to defeat the mechanism and steal food from the feeder. As will be seen, the present invention utilizes a shielding mechanism that behaves in a fashion substantially like a universal-joint. It is believed that no other prior feeders employ this universal-joint type of mechanism. Other objects will be mentioned below, or will become obvious as the description proceeds.

BRIEF DESCRIPTION OF THE DRAWINGS

FIG. 6b is an enlarged view of a detail area of FIG. 6a.

DETAILED DESCRIPTION OF THE PREFERRED EMBODIMENT

Figure 1:
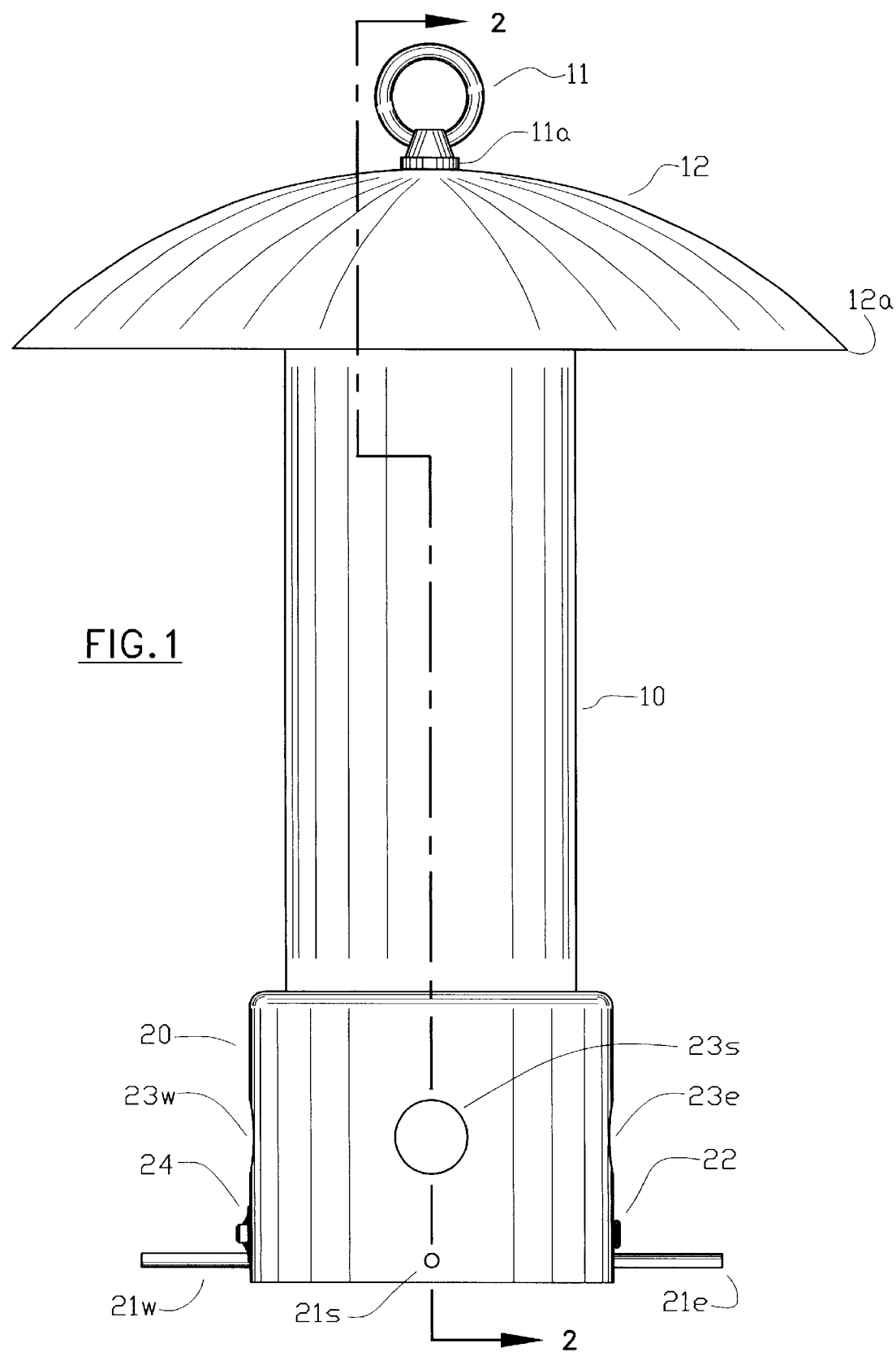
FIG. 1 is a side elevation view of a preferred embodiment of the invention.

Referring now to the drawings of FIGS. 1–4, the bird feeder therein shown will be seen to comprise a hollow cylindrical tube 10 having a top hanger loop 11 by which the entire feeder assembly readily may be pendulously suspended, typically from a tree limb. The feeder is shown as including an upper cover member 12 in the form of an inverted dish having a truncated spherical configuration. Cover member 12 has a substantial radius, so that rain running off the cover will not enter feed tube 10, and, importantly, so that a squirrel supporting itself atop cover member 12 cannot possibly reach around a circular edge 12a into the upper end of feed tube 10. In one embodiment tube 10 has an outside diameter of 4.00 inches (10.16 cm.) and a length of 15 inches (38.1 cm.), though such dimensions are not in any sense critical. In the preferred embodiment the tube 10 was constructed of transparent plastic having a wall thickness of approximately one-sixteenth inch (0.16 cm.). It is believed to be highly desirable that all or much of the wall of tube 10 be transparent, thereby to exhibit substantial quantities of feed to birds.

Figure 2:
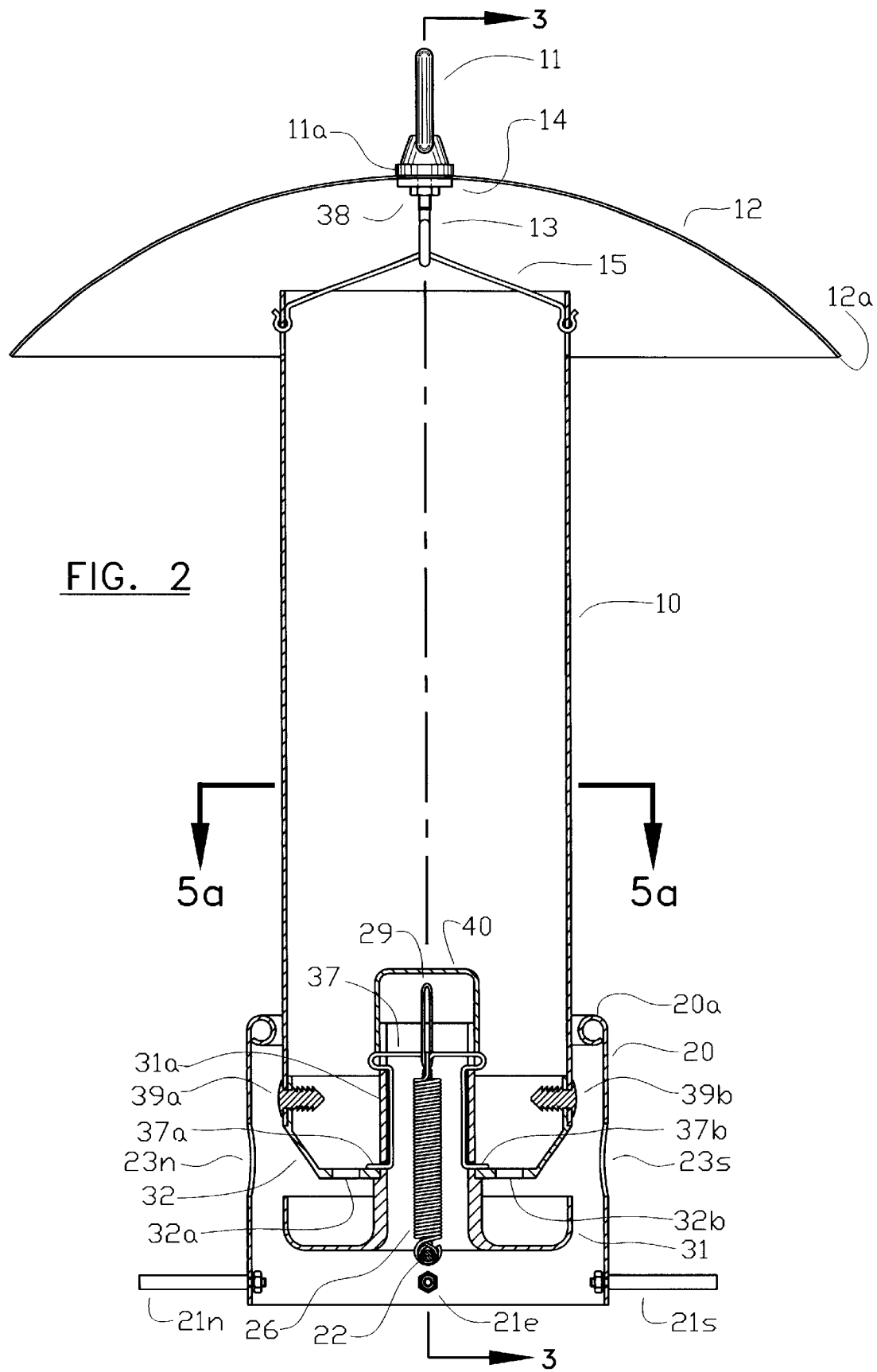
FIG. 2 is a sectional elevation view taken at lines 2—2 in FIG. 1.
Figure 3:
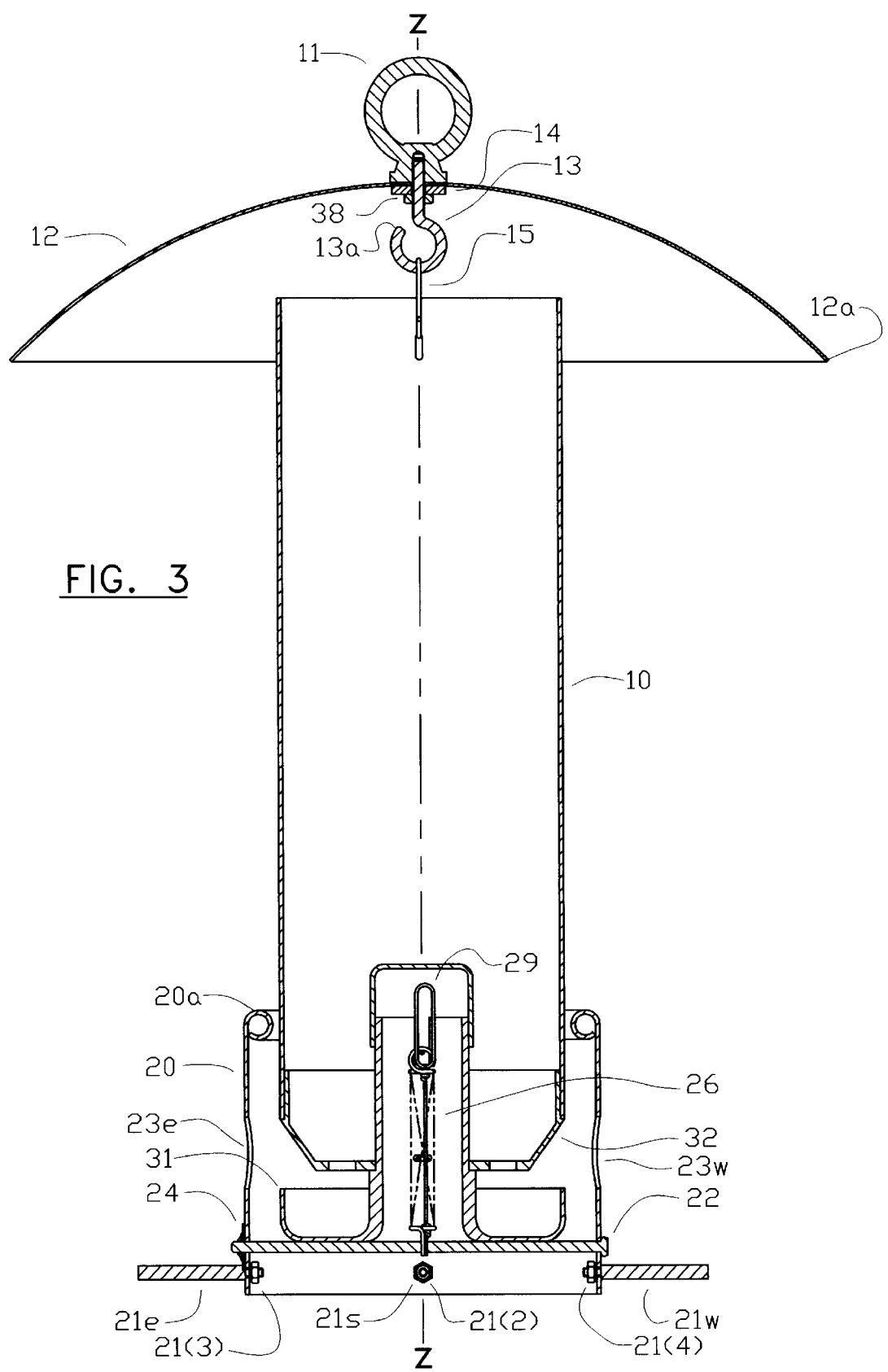
FIG. 3 is a section view taken at lines 3—3 in FIG. 2, with parts shown in the normal relative or rest positions they occupy in the absence of a squirrel or similar animal.

As seen in FIGS. 2 and 3, an integral base 11a, of hanger loop 11 has a central threaded hole which aligns with a central hole in cover 12. A second wire loop 13 has a threaded end which screws into threaded hole in base of hanger loop 11. A washer 14 and a locking nut 38 clamp cover 12 to loop 11 when threaded end of second loop 13 is screwed into threaded hole in base of hanger loop 11. Second loop 13 extends to engage a wire 15 connected across the upper end of feed tube 10, thereby pendulously supporting tube 10 and anything attached to it via hanger loop 11. While a squirrel cannot readily gain access to the upper end of tube 10, it will be seen that most humans could readily lift and tilt tube 10 in order to remove it for refilling, and then again to replace it.

As best seen in FIG. 2, an annular seed funnel 32 is shown inserted into lower end portion of cylindrical tube 10. Funnel 32 and tube 10 are locked together with a first plastic fastener 39a and a second plastic fastener 39b. An annular food tray 31 is shown having a central post member 31a which is inserted through a central hole in lower end of funnel 32. Feed tray 31 and funnel 32 are locked together by a first protruding lower end 37a and a second protruding lower end 37b of a wire bracket 37. A plastic cap 40 fits onto top portion of central post member 31a. Though not shown, the bird food that is poured into tube 10 will flow by gravity downward into top portion of funnel 32, and thence downward through a plurality of feed slots 32a and 32b into the annular trough area of food tray 31.

As will be seen in drawings of FIGS. 1–4, an annular collar 20 surrounds the lower portions of feed tube 10, funnel 32 and food tray 31. Collar 20 has a plurality of holes 23n, 23s, 23e and 23w which are positioned directly above an equivalent plurality of perches, respectively 21n, 21s, 21e and 21w. As seen in FIGS. 2 and 3, each perch is attached to collar 20 by a locking nut, respectively 21(1), 21(2), 21(3) and 21(4). The lowermost portion of collar 20 is bisected by a cross bar 22.

As shown in FIG. 3, a spring means 26 attaches to the central portion of cross bar 22, thus suspending collar 20 in a universal-joint fashion to allow pivoting or tilting in any direction relative to axis zz.

Figure 4:
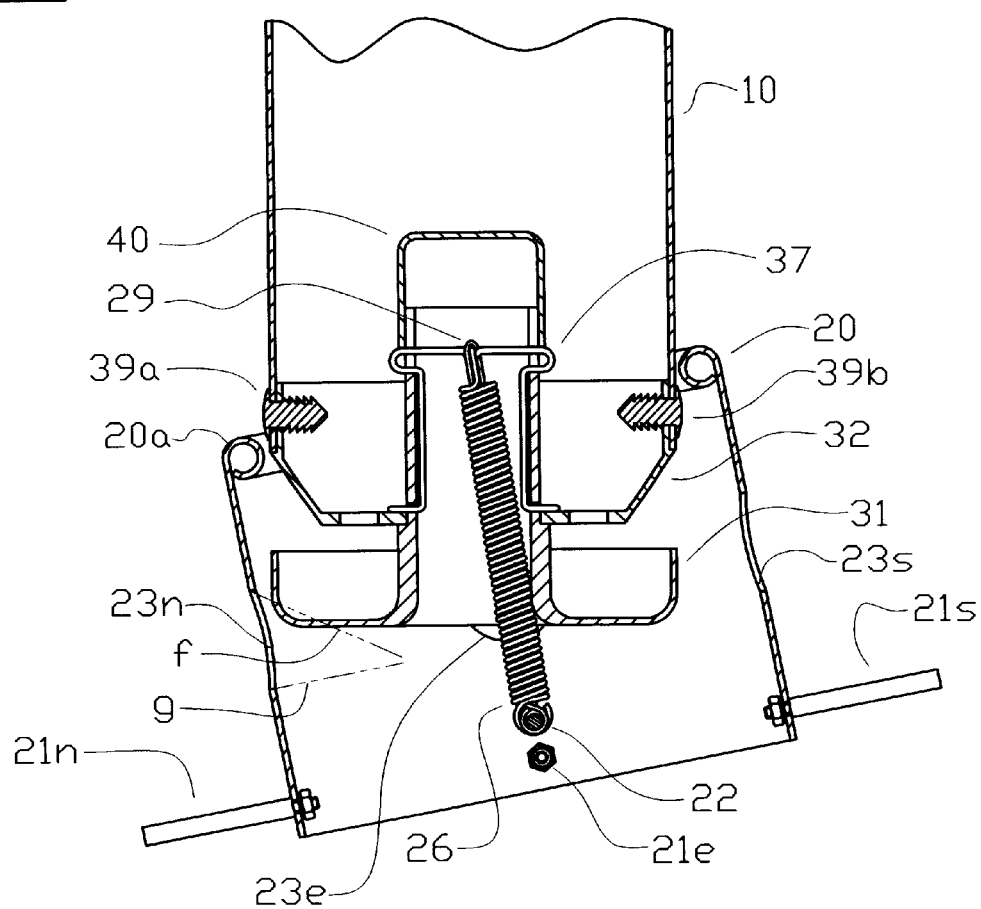
FIG. 4 is a section view similar to FIG. 2, but with certain parts displaced from their normal relative positions in a manner which occurs if a typical squirrel or similar animal engages the feeder in an attempt to extract food therefrom.

As shown in FIG. 4, with the spring mounting shown, the collar can tilt with perch 21n moving downward while perch 21s moves upward; alternatively, perch 21e might be moved downward while perch 21w moves upward. And of course, the pivoting can occur at any angle in between the cardinal points mentioned. This type of tilting, which is substantially like the manner of tilting as imparted by a universal joint, is not believed to exist in any prior feeders. Because the angle of this tilting is unpredictable, it is thought to better disorient, and thus better discourage, squirrels.

As best seen in FIGS. 2–4 and FIG. 5b, collar 20 is shown to have a rolled top edge 20a that is curled inward towards the center. This rolled edge facilitates both the tilting and downward translation of collar 20. As best seen in FIG. 4, this rolled edge also serves to create a seal between the top edge of collar 20 and the lowermost edge of tube 10, thereby preventing a squirrel or other animal from clinging to a perch such as 21n and stealing food by reaching over the top of collar 20 and down into food tray 31.

As shown in FIG. 3, collar 20 also may be seen to be rotatable about axis zz. Inasmuch as spring 26 acts as a theoretical long spring, it allows collar 20 to rotate in any direction. This rotation is not believed to exist in any prior feeders. This provides another element of unpredictability which is believed to further disorient and thus deter squirrel activity.

As best shown in FIG. 4, the spring suspension of collar 20 also allows substantial lineal translation of said collar relative to the rest of the feeder assembly. The distance of lineal translation is governed by a wire stop 29. This lineal translation provides another degree of unpredictable movement, which further enhances the effectiveness of the feeder's overall squirrel deterrency.

As best seen in FIG. 3, bar 22 extends through opposing holes in lower portion of collar 20 and lower looped ends of wire stop 29 and spring 26. Bar 22 is held in place by a locking clip 24. Tension of spring 26 holds bar 22 flush against the flat underside of food tray 31. Bar 22 and collar 20 are thus suspended, or dangled, in a relative fixed position.

Because the initial tension (approximately 24 ounces) of spring 26 exceeds the combined weight of collar 20, bar 22 and perches 21n, 21s, 21e and 21w, (approximately 12 ounces total) by a ratio of 2-1, the collar remains substantially fixed, or stationary, when used by a plurality of small songbirds (approximately 1 ounce or less each) for which it is designed. However, the weight of a squirrel (approximately 22 ounces each), when added to the weight of collar 20, bar 22 and perches 21n, s, e and w, is sufficient to overwhelm the initial tension of the spring. Upon the added weight of the average squirrel, the spring deflects, thus allowing the collar to tilt and move downwardly in simultaneous fashion, thereby occluding the feeding ports. In this manner, the squirrel is prevented from taking food.

Although spring 26 is shown as a coil type which ordinarily has an initial tension, the invention could instead utilize various other types of springs, including ones with coils that have space between their turns, as well as flat springs and other non-coil types of springs.

Figure 5A:
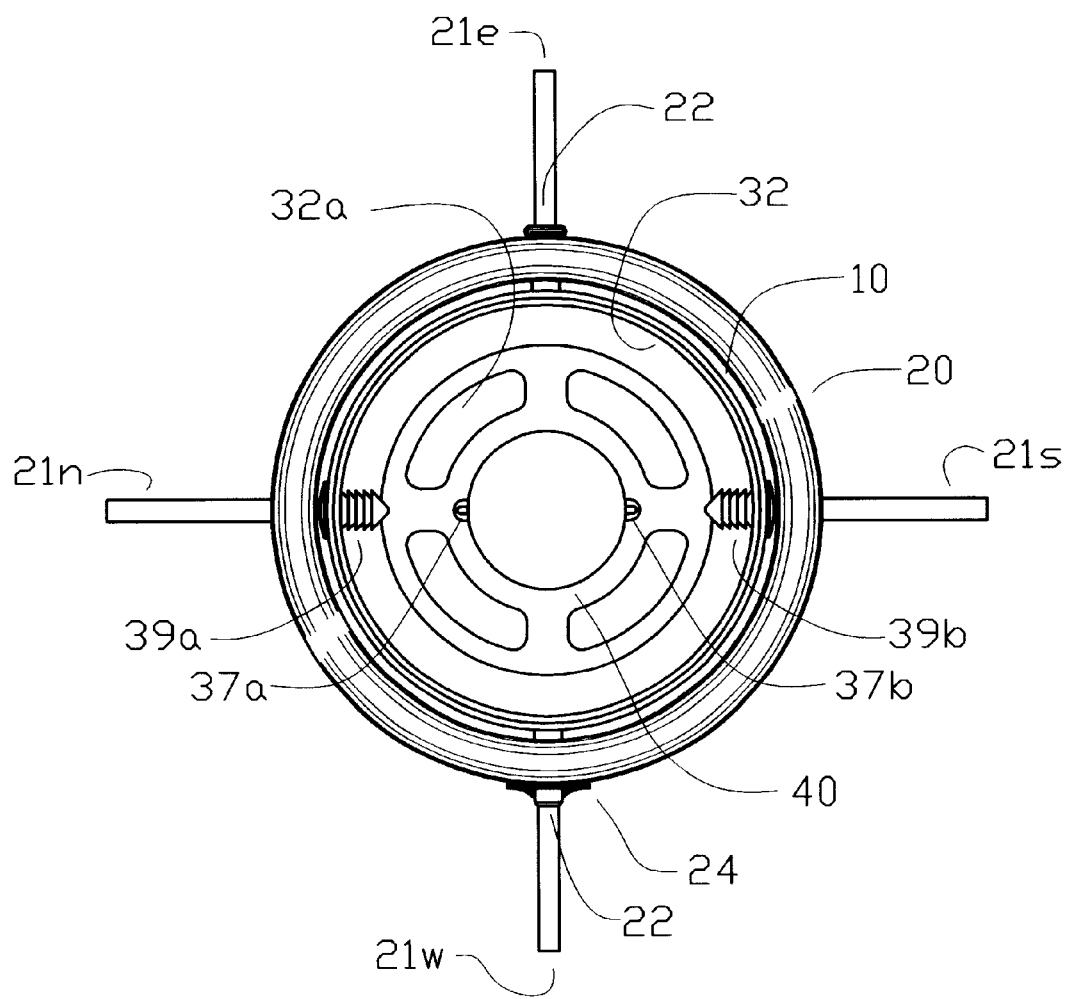
FIG. 5a is a diagrammatic downward view taken at lines 5a—5a in FIG. 2.
Figure 5B:
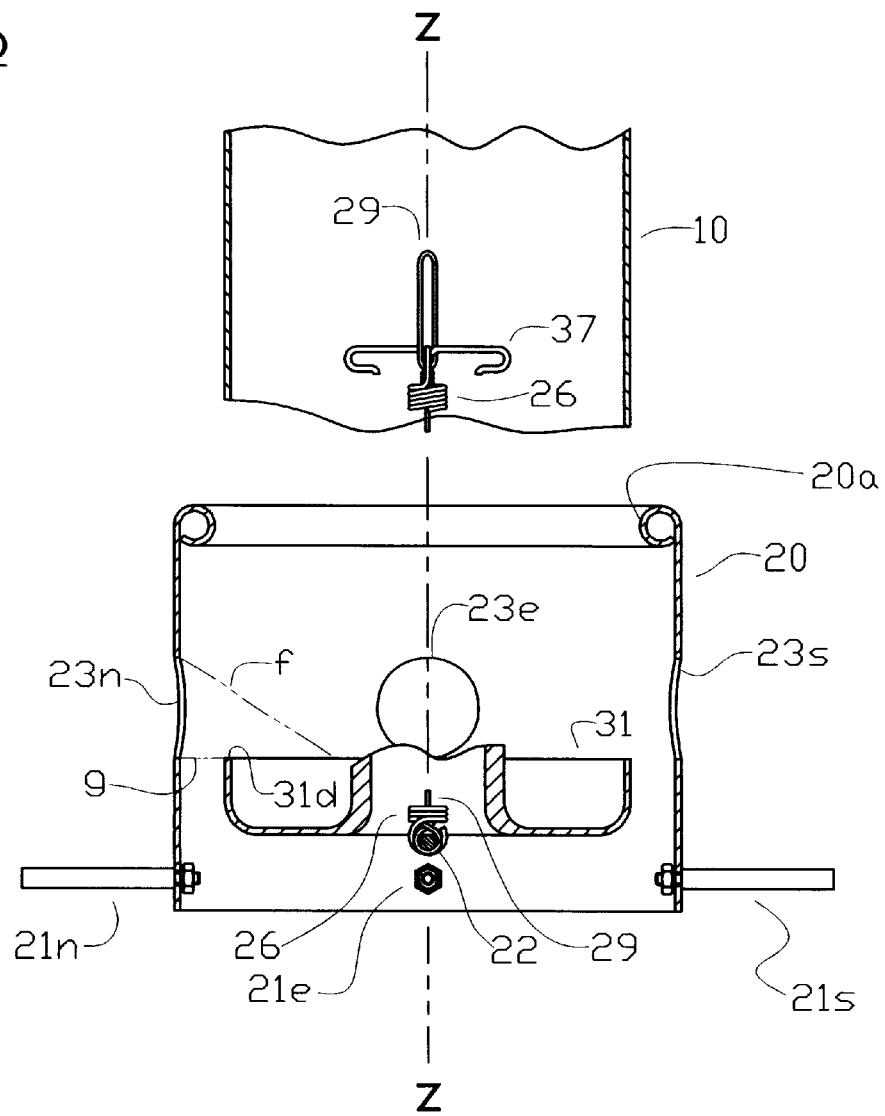
FIG. 5b is a diagrammatic side view useful in understanding some operative aspects of the invention.

Referring now to diagrammatic FIG. 5b, the food tray 31, wire bracket 37 and cylindrical tube 10 and no other parts shown in FIG. 5b will be referred to as being stationary. Similarly, in FIG. 5b spring 26, wire stop 29, collar 20, cross bar 22 and perches 21n, 21e and 21s will be referred to as being moveable. Collar 20 is not only tiltable relative to the vertical central axis z—z of the stationary tube 10, and rotatable about said axis, but also translatable downwardly along said axis. This complexity of movements of all moveable parts relative to the stationary parts is not believed to exist in any prior feeders. Moreover, this complexity is believed to provide much enhanced squirrel deterrency.

In FIG. 5b a dashed-line f is shown extending from the top of hole 23n of collar 20 to a point near the middle of feed tray 31, and a dashed-line g is shown extending from the bottom of hole 23n across top of an outer wall 31d of tray 31 to terminus of dashed-line f. Lines f and g thus define, in a two-dimensional sense, and with some approximation, the size of the passage through which a bird located outside the feeder might reach with its beak in order to take food (not shown) out of the annular trough area of feed tray 31, if the bird did not apply substantial downward weight to perch location 21n. Line f is shown terminating somewhat short of the central post member of tray 31 because the usual bird for which the feeder is intended may not have a beak long enough to reach that central post.

A respective opening shown as comprising a circular hole is provided in collar 20 above each perch location, three such holes being shown in FIG. 5b at 23n, 23e and 23s. As best seen in FIG. 5b, collar 20 is suspended from the stationary structure of cylinder 10 by coil spring 26, one end of which is shown attached to wire bracket 37, and the other end of which is shown fixedly attached to bar 22 on collar 20. Wire stop 29 is shown with an upper, extended loop end attached to wire bracket 37, with the opposing loop end attached to bar 22 on collar 20. The middle portion of wire stop 29 can be seen to extend down through the center of spring 26.

In FIG. 5a perches 21n, 21s, 21e and 21w are shown protruding from the cylindrical outer surface of collar 20 so as to provide four perch locations upon which one or more birds may perch. A cardinal compass-point N, S, E or W meaning North, South East or West is shown adjacent each perch location solely to facilitate discussion. Flat end of bar 22 can be seen protruding from collar 20, with opposing end of bar 22 held in place with locking clip 24.

As shown in FIG. 4, it will be clear that if appropriate downward forces are applied to one or more of the four perch locations, collar 20 may be tilted downwardly not only in any of the four cardinal-point directions, but also in any intermediate direction between any adjacent pair of cardinal-point directions. The passage toward food, as illustrated by dashed-line f and dashed-line g, can be completely occluded, with all of opening 23n lowering well below the upper edge of the outer shoulder of tray 31. It should be noted that the length of the upper loop portion of wire stop 29 limits the distance which collar 20 can translate downwardly.

Inasmuch as coil spring 26 has numerous turns it acts as a theoretical "long spring" for both translation and rotation. Otherwise stated, (1) the upward force which spring 26 applies to collar 20 varies little percentage-wise between an "unloaded" condition wherein no downward force is applied to any perch location and a "maximum-loaded" condition wherein wire-stop 29 acts as a stop to limit the stretching of spring 26, and (2) rotation of collar about the z—z axis for even a full turn or 360 degrees or more does not wind-up or unwind spring 26 so as to result in an appreciable spring force affecting rotation.

Figure 6A:
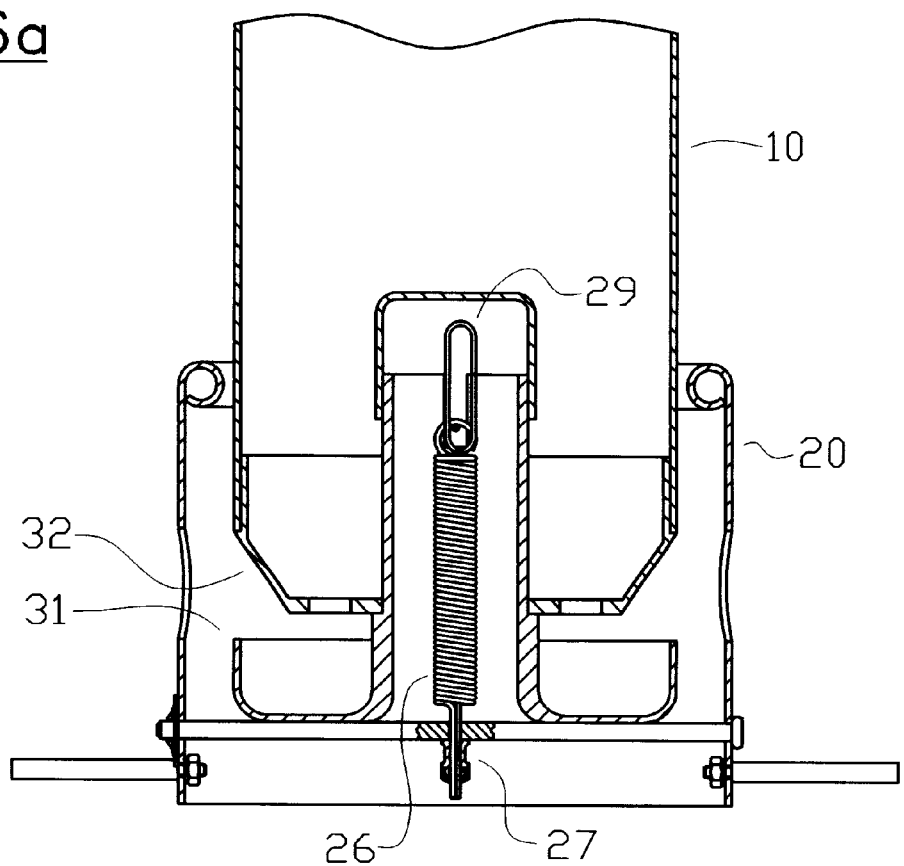
FIG. 6a is a side elevation view illustrating one possible modification in the apparatus of FIGS. 1–4, 5a and 5b.
Figure 6B:
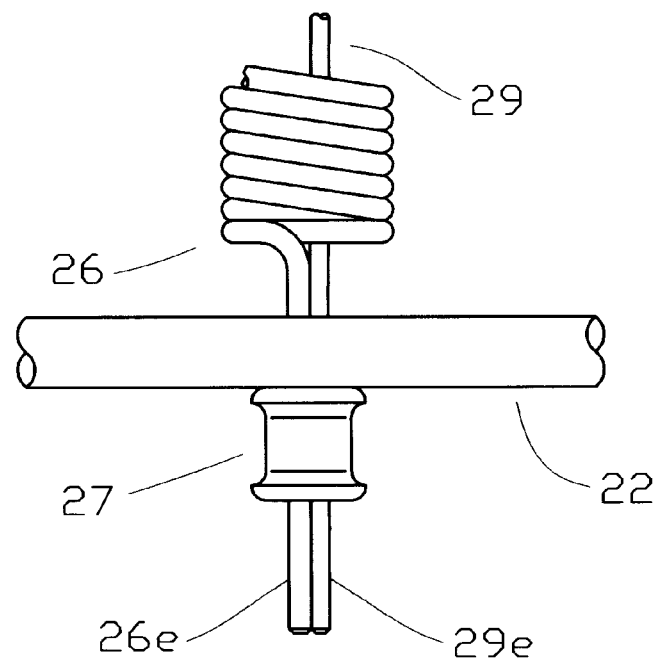

It should become apparent at this point that one may easily prevent any spring unwind or windup by merely mounting bar 22 and collar 20 in a rotatable fashion. In FIGS. 6a and 6b, the lower end 26e of spring 26 and lower end 29e of wire stop 29 is shown passing through a hole drilled in bar 22, with a crimped fastener 27 staked on end 26e and end 29e, so that bar 22 and collar 20 may rotate relative to end 26e, end 29e and crimped fastener 27 through as many rotations as desired.

In various embodiments tube 10 may be formed of metal, or glass, or a different plastic. The tube need not be transparent, though many users believe that transparency is advantageous because bird activity tends to be increased if food is visible.

I claim:

1. A bird feeder comprising, in combination: an annular food tray having a side wall for retaining food material on the tray; a hollow generally-cylindrical collar substantially coaxially surrounding said food tray; and spring means extending between said collar and said food tray to allow said collar to translate upwardly or downwardly relative to said food tray and simultaneously to allow limited pivotal movement of said collar relative to said food tray in any direction about the axis of said food tray.

2. A bird feeder according to claim 1 wherein said collar has a top portion which is rolled inwardly to provide a rounded edge whereby said collar may engage and disengage said food tray as said collar pivots and translates relative to said food tray.

3. A bird feeder according to claim 1 having a food storage tube means connected to said food tray and extending upwardly from said food tray to a level above the topmost level of said collar.

4. A bird feeder according to claim 3 having hanger means affixed to said food storage tube adjacent the end of said tube remote from the attachment of said food tray to said food storage tube.

5. A bird feeder according to claim 1 wherein said spring means comprises a coil spring having its ends fixedly attached respectively to said collar and said food tray, whereby rotation of said collar in one or the other direction about said axis of said annular food tray will tend to windup or unwind said coil spring.

6. A bird feeder according to claim 1 having stop means to limit translation of said collar.

7. A bird feeder according to claim 1 in which said collar carries a plurality of perch rod means spaced around said collar and extending generally radially outwardly from said collar, and a plurality of openings through said collar, each of said openings being spaced relative to and associated with a respective one of said perch rod means.

8. A bird feeder according to claim 1 wherein said spring means allows said collar to pivot at least 5 degrees from the axis of said food tray in any direction about the axis of said food tray.

9. A bird feeder according to claim 1 wherein said spring means comprises a coil spring having at least one of its ends rotatably attached to said collar or to said food tray, whereby rotation of said collar relative to said food tray need not wind up or unwind said coil spring.

10. A bird feeder according to claim 1 wherein said spring means is operable in the absence of extraneous downward force of sufficient magnitude being applied to said collar to maintain said collar at a translational position within a first range of translational positions of said collar relative to said food tray, and to maintain said collar at a reference pivotal position within a first range of pivoting positions of said collar relative to said food tray, said collar including at least one opening through which an animal may reach across the top of said side wall of said food tray to remove food carried on the food tray only during times at which said collar lies within said first range of translational positions and within said first range of pivoting positions, whereby the forces applied to said collar by smaller animals, such as birds, are insufficient to move said collar out of said first range of translational positions and out of said first range of pivotal positions, but the forces applied to the collar by larger animals, such as squirrels, are sufficient to move said collar out of said first range of translational positions, or out of said first range of pivoting positions, or out of both said ranges, thereby so moving said collar relative to said food tray that said opening in said collar is not positioned to allow an animal to reach through said opening over said side wall of said food tray to remove food therefrom.

11. A bird feeder comprising, in combination: an annular food tray having a side wall for retaining food material on the tray; a hollow generally-cylindrical collar substantially coaxially surrounding said food tray; and spring means extending between said collar and said food tray to allow said collar to translate upwardly or downwardly relative to said food tray and simultaneously to allow said collar to rotate in either direction about said axis of said food tray.

12. A bird feeder comprising, in combination: an annular food tray having a side wall for retaining food material on said tray; a hollow generally-cylindrical collar substantially coaxially surrounding said annular food tray; and spring means extending between said collar and said food tray to allow limited translational movement of said collar relative to said food tray, limited pivotal movement of said collar relative to said food tray in any direction about the axis of said food tray, and to allow rotational movement of said collar in either direction about said axis of said food tray, each one of said three mentioned types of movements being able to occur separately, or simultaneously with one or with both of the other two types of movements, should appropriate extraneous forces to cause such movements be applied to said bird feeder.

* * * * *